Patented May 25, 1948

2,442,086

UNITED STATES PATENT OFFICE 2,442,086

DRYING OIL-(BUTADIENE-STYRENE) RESINS

Curtis E. Huff and James H. Clynch, Mishawaka, Ind., assignors to United States Rubber Company, New York, N. Y., a corporation of New Jersey No Drawing. Application September 4, 1944, Serial No. 552,679

9 Claims. (Cl. 260—23)

This invention relates to improvements in thermal copolymer resins, suitable as plasticizers, or for varnishes, and particularly for footwear varnishes, to form tough elastic films.

We have discovered that such a copolymer resin is produced from thermally copolymerizing a vegetable or marine drying oil having an iodine number of at least 100, with a butadiene-styrene copolymer rubber, especially of the synthetic rubber type known as GR-S. Such a copolymer rubber is known to be made by copolymerizing 50 to 75 parts by weight of butadiene-1,3 with, respectively, 50 to 25 parts by weight of styrene. The temperature of heating with the oil, should be above 400° F.

The proportion of synthetic rubber to the oil may vary from 5 to 20 parts by weight for every 100 parts by weight of the oil, and is preferably on the order of 10 parts of the synthetic rubber per 100 parts of the oil.

In preparing the mix for copolymerization, the synthetic rubber, i. e., GR-S, is dissolved to about a 15% solution in a suitable solvent such as toluene, naphtha, propylene dichloride, etc. Enough of the solution is then dispersed in the oil, for example, linseed oil, at room temperature, responding to the above proportionation, and afterwards the solvent is removed by heat, air blowing, or otherwise.

In copolymerizing the drying oil with the GR-S, the temperature is raised while vigorously stirring, to about 450° F. until the mix forms a homogeneous fluid having a viscosity of approximately 50 centipoises. After about 8 hours at 450° F. this fluid rapidly thickens to a solid gel. The viscosity may be controlled by controlling the degree of thickening (copolymerization), by inclusion during the heating of an inhibitor antioxidant (usually added—as about 1 part by weight per 100 parts by weight of the drying oil). For example, for a varnish base, the antioxidant is added to stop the polymerization when the viscosity is about 300 centipoises at 450° F. For preparation of plasticizers, and for other purposes, the cooking is stopped at other viscosities, for example for GR-S plasticizer, viscosity should be 800 centipoises+ at 450° F.

If desired, in order to accelerate the rate of copolymerization, there may be added to the mix, before or during the cooking, a known oxygen-containing catalyst, such as benzoyl peroxide, hydrogen peroxide, ammonium persulfate, boron trioxide, etc.

The following examples illustrate the invention, the parts being by weight:

*Example 1.—Varnish base vehicle*

|  | Solution | Solids |
|---|---|---|
| Raw Linseed Oil | 90 | 90 |
| In cement: |  |  |
| GR-S Rubber | 10 | 10 |
| Propylene Dichloride | 53 | ------ |
| Total | 153 | 100 |

The GR-S cement is dispersed into the linseed oil. The solvent is evaporated by heating and stirring. The temperature is raised to 450° F. where it is held until completion of cook.

The following viscosities are noted at 450° F.

| Time of Cook Hours | Viscosity Centipoises at 450° F. |
|---|---|
| 1 | 40 |
| 2 | 40 |
| 3 | 40 |
| 4 | 40 |
| 5 | 40 |
| 6 | 40 |
| 7 | 40 |
| 8 | 45 |
| 9 | 50 |
| 10 | 75 |
| 11 | 115 |
| 12 | 250 |
| 12½ | 625 |

For varnishes 1 part of a rubber antioxidant such as diphenyl p-phenylene diamine, Agerite resin D (believed to be polymerized trimethyl dihydro-quinoline), or BLE (acetone-diphenylamine condensate) is added per 100 parts of base to inhibit further polymerization.

To make a varnish, as for rubber footwear, the following recipe may be used:

| | Parts |
|---|---|
| Varnish base vehicle (above) | 100.00 |
| Dye (black oil soluble) | 3.00 |
| Wetting agent (Aerosol OT) | 0.50 |
| Drier (iron naphthenate) | 2.00 |
| Solvent: | |
| Propylene dichloride | 100.00 |
| Ethyl acetate | 100.00 |
| Lacquer thinner | 200.00 |
| Toluene substitute | 200.00 |

Aerosol OT is a well-known wetting agent (see page 16 of the January 1941 issue of Industrial and Engineering Chemistry); it is stated to be dioctyl ester of sodium sulfosuccinic acid.

Compounded unvulcanized synthetic GR-S rubber footwear is dipped in the varnish, then vulcanized in an air-stream, ammonia cure at 260° F. for 3 hours. The varnish forms a very smooth, glossy, mar-resistant surface on the shoes. In comparison, a standard recipe using bodied linseed oil as the vehicle (without GR-S) does not form a satisfactory finish for the GR-S rubber footwear.

Natural resins as congo, rosin, manila, etc., may be added as a third ingredient in the recipe when special qualities are desired. In general, these resins make a harder and drier film which is more suitable for hard surfaces. Synthetic resins as phenolics, maleic anhydride derivatives, alkyds, and ester gums also may be added for imparting special properties. Their effects are commonly known to the varnish making art.

*Example II.—Varnish base vehicle*

|  | Solution | Solids |
| --- | --- | --- |
| Raw Linseed Oil | 90 | 90 |
| Butadiene-Styrene (75:25) copolymer rubber | 10 | 10 |
| In cement: |  |  |
| Propylene Dichloride | 50 |  |
| Fused Congo Resin | 10 | 10 |
| Total | 160 | 110 |

The butadiene-styrene copolymer and congo cement are dispersed into the linseed oil. The solvent is evaporated by heating and stirring. The temperature is raised to 450° F. where it is held until completion of the cook. The following viscosities are noted:

| Time of Cook Hours | Viscosity Centipoises at 450° F. |
| --- | --- |
| 2 | 40 |
| 4 | 40 |
| 6 | 40 |
| 8 | 40 |
| 10 | 80 |
| 11 | 325 |

To make a varnish, as for GR-S rubber footwear, the following recipe may be used:

| | Parts |
| --- | --- |
| Varnish base, Example II | 100.00 |
| Dye | 3.00 |
| Wetting agent (Aerosol OT) | 0.50 |
| Drier (iron naphthenate) | 2.00 |
| Solvent: | |
| Propylene dichloride | 100.00 |
| Ethyl acetate | 100.00 |
| Lacquer thinner | 200.00 |
| Toluene substitute | 200.00 |

To make plasticizers for a butadiene-styrene copolymer rubber-like material (GR-S) larger amounts of natural resins may be added so that the plasticized rubber exhibits more tack and bonding strength.

*Example III.—Plasticizer for GR-S rubber*

| | |
| --- | --- |
| Raw linseed oil | 90 |
| In cement: | |
| Butadiene-styrene copolymer | 10 |
| Propylene dichloride | 50 |
| Fused congo resin | 25 |
| Wood rosin | 20 |
| Total | 195 |

The butadiene-styrene copolymer, fused congo resin, and wood rosin are dissolved into a cement which is dispersed into the linseed oil. The solvent is evaporated by heating and stirring. The temperature is raised to 450° F., where it is held until completion of the cook. The cook is considered complete when it becomes a thick gel at 450° F.

Butadiene-styrene copolymer rubber-like material compounded with carbon black, zinc oxide, accelerators, sulfur and this plasticizer vulcanizes to as strong and as serviceable a product as similar compounds using ordinary esters, coal tar, and paraffinic oil plasticizers for GR-S. Besides plasticizing, the plasticizer above, produces a fusing gum that knitted and bonded together better during the vulcanization; also its uncured compound has greater tack and bonding strength than compounds using common plasticizers.

The viscosity at which cooking is discontinued varies somewhat with the type of oil and the ratio of the rubbery butadiene-styrene copolymer to the oil, and the presence or absence of a solvent, as shown herein, and as will be understood by those skilled in the art.

Having thus described our invention, what we claim and desire to protect by Letters Patent is:

1. A thermal copolymer of a vegetable drying oil having an iodine number in the range from 100 to that for linseed oil with butadiene-1,3-styrene copolymer rubber, the proportion of the said copolymer rubber ranging from 5 to 20 parts by weight for every 100 parts by weight of the oil, said thermal copolymer resulting from the application of heat above about 400° F. and for a time sufficient to form a homogeneous viscous resinous mass having a viscosity at 450° F. of more than 50 centipoises.

2. A thermal copolymer of linseed oil with butadiene-1,3-styrene copolymer rubber, the proportion of the said copolymer rubber ranging from 5 to 20 parts by weight for every 100 parts by weight of the oil, said thermal copolymer resulting from the application of heat above about 400° F. and for a time sufficient to form a homogeneous viscous resinous mass having a viscosity at 450° F. of more than 50 centipoises.

3. A method of preparing a modified drying oil resin which comprises heating an admixture composed of 100 parts by weight of a vegetable drying oil having an iodine number in the range from 100 up to that for linseed oil, and from 5 to 20 parts by weight of butadiene-1,3-styrene copolymer rubber, to a temperature above about 400° F. and for a time sufficient to form a homogeneous viscous resinous mass having a viscosity at 450° F. of more than 50 centipoises.

4. A method of preparing a modified drying oil resin which comprises heating an admixture composed of 100 parts by weight of linseed oil, and from 5 to 20 parts by weight of butadiene-1,3-styrene copolymer rubber, to a temperature above about 400° F. until the mix reaches a viscosity measured at 450° F. of over 50 centipoises.

5. A varnish resin resulting from the process as set forth in claim 4.

6. A method of preparing a modified drying oil resin which comprises heating an admixture composed of 100 parts by weight of linseed oil, and from 5 to 20 parts by weight of butadiene-1,3-styrene copolymer rubber, to a temperature above about 400° F. until the mix reaches a viscosity measured at 450° F. of about 800 centipoises.

7. A plasticizer resin resulting from the process as set forth in claim 6.

8. A method of preparing a modified drying oil resin which comprises heating an admixture composed of 100 parts by weight of a vegetable drying oil having an iodine number in the range from 100 up to that for linseed oil, and from 5 to 20 parts by weight of butadiene-1,3-styrene copolymer rubber, to a temperature above about 400° F. and for a time sufficient to form a resinous mass having a viscosity at 450° F. of more than 50 centipoises.

9. A method of preparing a modified drying oil resin which comprises heating an admixture composed of 100 parts by weight of a vegetable drying oil having an iodine number in the range from 100 up to that for linseed oil, and from 5 to 20 parts by weight of butadiene-1,3-styrene copolymer rubber, to a temperature above about 400° F. and for a time sufficient to form a homogeneous fluid, and thereafter continuing the heating until the fluid thickens to a solid gel.

CURTIS E. HUFF.
JAMES H. CLYNCH.

REFERENCES CITED

The following references are of record in the file of this patent:

UNITED STATES PATENTS

| Number | Name | Date |
|---|---|---|
| 2,324,980 | Kilbourne | July 20, 1943 |

Certificate of Correction

Patent No. 2,442,086.　　　　　　　　　　　　　　　　　　　May 25, 1948.

CURTIS E. HUFF ET AL.

It is hereby certified that error appears in the printed specification of the above numbered patent requiring correction as follows: Column 2, line 55, for "air-stream" read *air-steam*; and that the said Letters Patent should be read with this correction therein that the same may conform to the record of the case in the Patent Office.

Signed and sealed this 12th day of October, A. D. 1948.

[SEAL]

THOMAS F. MURPHY,
*Assistant Commissioner of Patents.*